United States Patent Office 3,586,510
Patented June 22, 1971

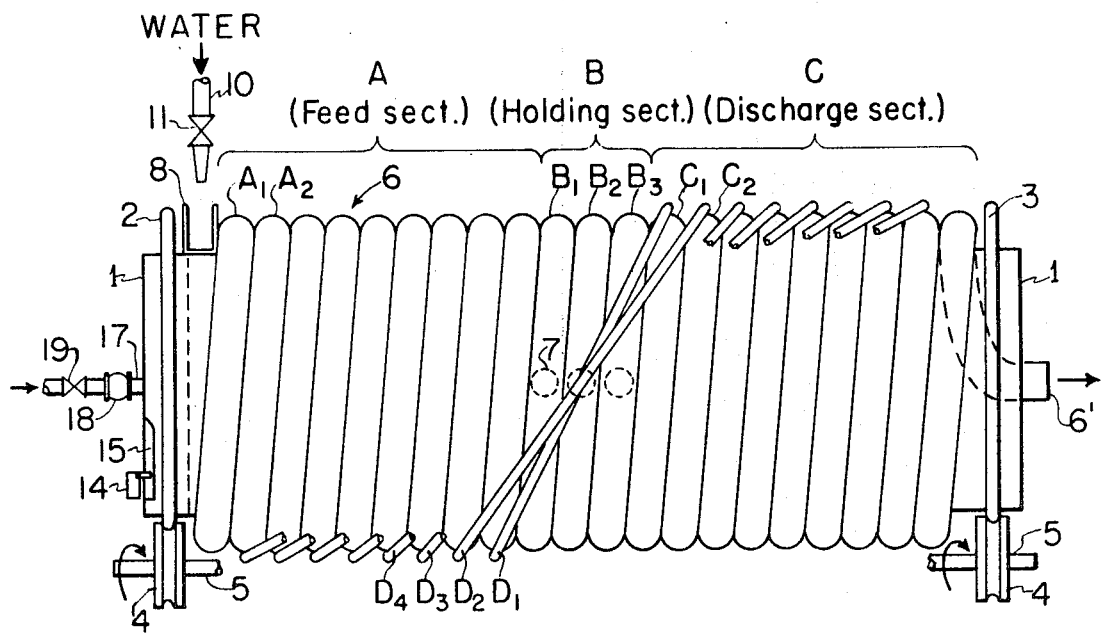
FIG. 1
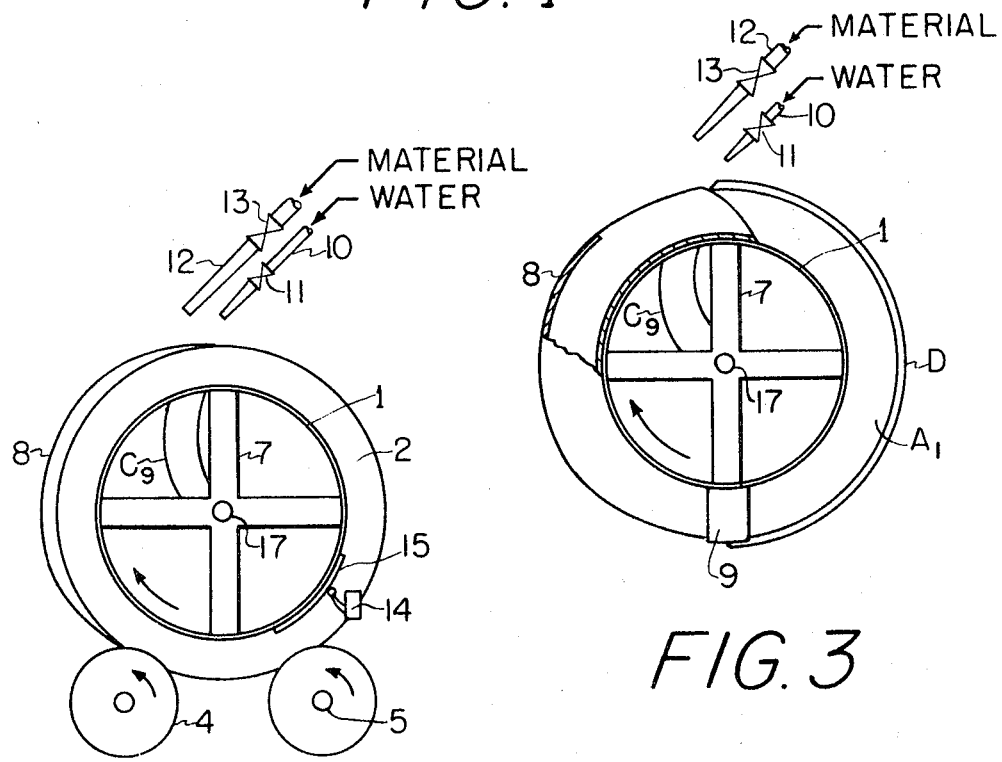
FIG. 2
FIG. 3
D.F. FARKAS & W.C. ROCKWELL
INVENTORS
BY R. Hoffman & W. Takacs
ATTORNEYS

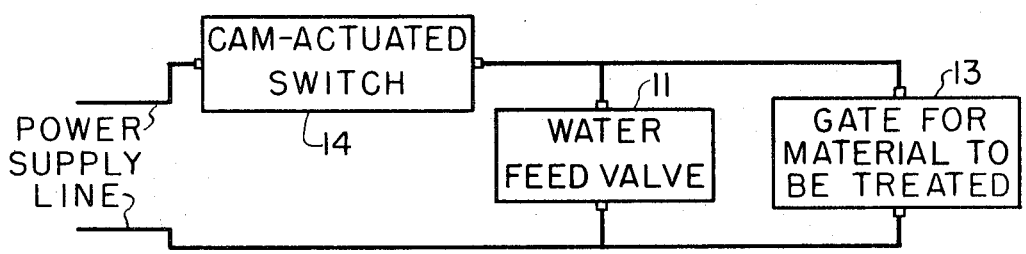
FIG. 5
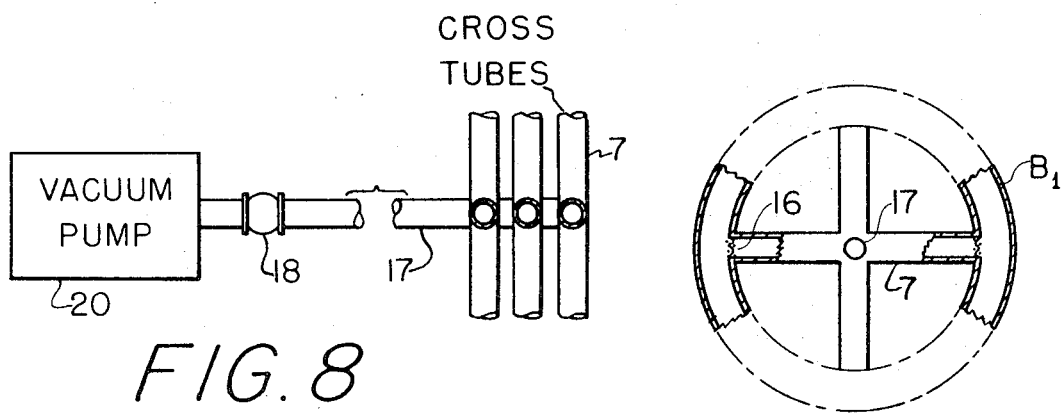
FIG. 8
FIG. 4
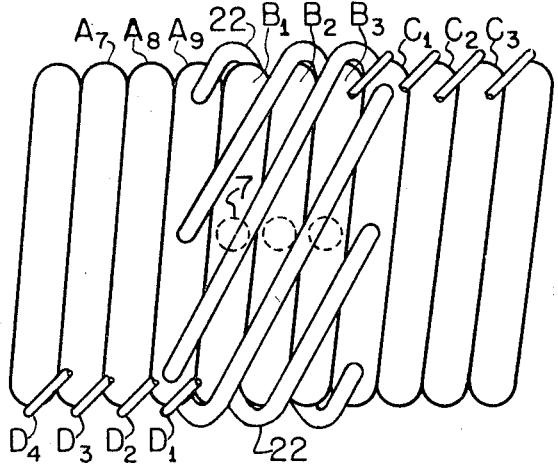
FIG. 9

3,586,510
HELICAL PUMP SYSTEM AND USE IN PROCESSING OF FOODS
Daniel Frederick Farkas, Berkeley, and William C. Rockwell, El Cerrito, Calif., assignors to the United States of America as represented by the Secretary of Agriculture
Filed June 13, 1969, Ser. No. 833,110
Int. Cl. A23l 1/00
U.S. Cl. 99—1                                             14 Claims

ABSTRACT OF THE DISCLOSURE

Device for treating materials—e.g., fruits, vegetables, grains, packaged foods, etc.—at pressures above or below atmospheric pressure, which includes a helical pumping system for conveying the material into and out of the treatment zone whereby the integrity of the material is preserved, even where it is of a delicate nature as is the case, for example, with berries, peach halves, foods packaged in plastic pouches, etc. A special feature of the helical pump is the provision of an air feedback arrangement for increasing pumping efficiency and for avoiding instability during operation.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of a novel helical pumping system useful for conveying materials into and out of a zone maintained at a pressure above or below atmospheric pressure. The objects of the invention also include the provision of novel apparatus for the treatment of materials (typically foods such as fruits, vegetables, grains, or packaged foods) at pressures above or below atmospheric pressure, employing the helical pumping system for conveying the material into and out of the treatment zone. Further objects of the invention will be evident from the following description and the attached drawing.

In the following explanation, the application of the invention to pressure treatment systems is emphasized. However, the invention is also applicable to systems operating at subatmospheric pressures, and such applications will be explained in a later portion of the description.

In the processing of various commodities it is conventional to include one or more treatments under pressure. Typical examples thereof are the cooking of potatoes or grains, the sterilizing of canned or otherwise packaged foods, etc. Where apparatus for pressure treatment is operated on a continuous basis, it is necessary to provide some means whereby the material can be conveyed into and out of the pressure zone without loss of pressure. Among the conventional devices for such purpose are pumps. However, prior art pumps are primarily suitable for handling liquids or mixtures of liquids and small objects such as cereal grains; the handling of large and delicate objects such as plastic pouches of foods is out of the question. The use of tall columns of water—or barometric legs as they are usually called—is possible, but these are very bulky. For example, a pressure chamber operating at 10 p.s.i.g. would require two legs (one for feeding, one for discharge), each at least 23 feet tall. Pressure lock devices are available but have the disadvantages of involving complex and expensive mechanisms.

A primary object of the invention is the provision of apparatus by which the foregoing problem is obviated. The system of the invention is not only effective in conveying objects into and out of the pressure (or vacuum) zone but does so without harming the objects being conveyed, even where they are of a delicate nature as is the case with berries, peach slices, other fruits or vegetables, and food products packed in pouches or sacks of plastic, foil, or the like. Moreover, the system of the invention is relatively simple in construction, and much more compact than hydrostatic column devices.

In the co-pending application of Daniel F. Farkas and Melvin E. Lazar, Ser. No. 729,626 filed May 16, 1968, now Patent No. 3,489,074, there is disclosed apparatus wherein helical pumps are employed to convey material into and out of a treatment zone maintained at super- or sub-atmospheric pressure. Basically, each of the disclosed helical pumps comprises a coil of tubing wound on a drum, and means to rotate the drum (and coil) whereby to convey material through the coil and into (or out of) the treatment zone. Although the apparatus in question is useful and operative, our investigations have shown that it is subject to certain problems. One of these is that the described helical pumps do not develop maximum efficiency. For example, when used to feed material into a zone at superatmospheric pressure the hydrostatic heads in successive turns of the coil do not assume the full heights made capable by the diameter of the coil, but are reduced due to compression of air between the heads. This means then that the capability of the apparatus is not being utilized fully. A second problem of the aforesaid device lies in operation of the helical pump at the discharge end, i.e., the one used to convey water and material out of the pressurized zone. At times, water and material may be forcibly blown out of the discharge end of the pump. This we have determined, is primarily due to expansion of air as the decompression takes place and is aggravated by formation of bubbles of air mixing or emulsifying in the liquid phase (and so lowering the density of the hydrostatic heads, i.e., reducing their effective height so that they are not capable of resisting the back pressure of air). A third problem with the disclosed device is that trouble is encountered because of transient conditions. These transients may be occasioned by minor variations in rate of material being fed, trapping bubbles of air in the water entering the system, minor variations in the rate of water being fed into the system, etc. These transients will cause instability of operation manifested by such effects as temporary reduction in rate of throughput of material, funneling of water and material out of the discharge end of the system, temporary loss of pressure in the treatment zone, etc.

A particular object of the invention is the provision of means for alleviating the problems outlined above. Thus, the helical pumping system of the invention develops a high efficiency—essentially that which is made capable by the dimensions of the equipment. Also with our device, no trouble is caused by expansion of air in the discharge portion of the helical pump. In fact, the expanding air is utilized to enhance efficiency at the feed end of the system. Moreover, our device is stable in operation; transients do not cause any untoward effects.

The manner in which the aforesaid objects and advantages are attained is next described in detail, having reference to the annexed drawing wherein:

FIG. 1 is a diagrammatic view of apparatus in accordance with the invention. To avoid confusion with mechanical parts, electrical connections have been omitted.

FIG. 2 is an end view of the apparatus of FIG. 1. FIG. 3 is another end view in which several parts, including flange 2, have been omitted to permit detailing the construction of scoop 8. FIG. 4 is a fragmentary end view illustrating the connection of cross tubes 7.

FIG. 5 is a wiring diagram illustrating the various electrical components of the apparatus.

FIG. 8 is a fragmentary view of a modification of the system for operation at sub-atmospheric pressure.

FIG. 9 is a fragmentary view of a modification of the system wherein means is provided to bypass the carrier fluid around the holding section.

Figure 7:
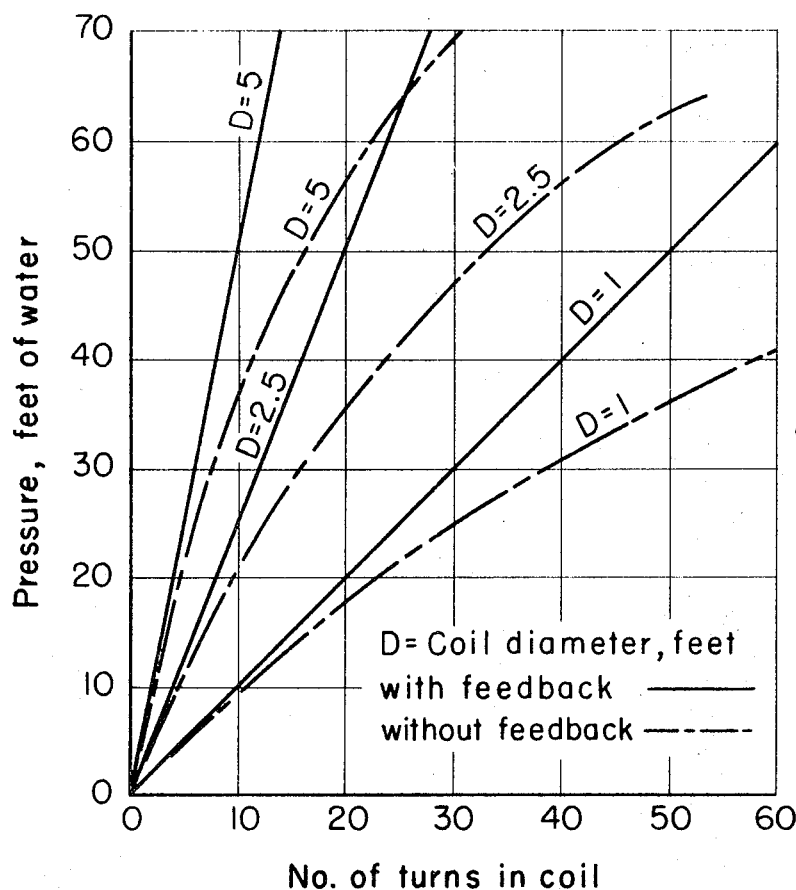
FIG. 7 is a graph illustrating the advantages of the invention.

Directing particular attention to FIGS. 1 to 4, reference numeral 1 designates a drum which provides the support for a major portion of the apparatus. Drum 1 is equipped with flanges 2 and 3 which ride on pulleys 4 keyed on shafts 5. A suitable means such as a variable speed electric motor (not illustrated) is provided for driving shafts 5 whereby drum 1 is rotated in the direction indicated by the arrow (FIG. 2). In operation of the apparatus, drum 1 is maintained in rotation. The rotation may be continuous, or it may be intermittent—for example, the drum may be rotated a single revolution at a time with a pause between each revolution for feeding water and material to be treated into the system.

Wound on drum 1 is a continuous coil of tubing, generally designated as 6, which includes three sections, detailed as follows: Feed section A, made up of turns $A_1$, $A_2$, $A_3$, etc., serves to feed the material into the system, in particular into holding section B, made up of turns $B_1$, $B_2$, and $B_3$. Within section B the material is subjected to selected conditions as to pressure, temperature, etc. as may be desired for a particular treatment. Also forming part of section B are cross tubes 7 which connect the top, bottom, front, and back portions of section B. The treated material is exited from the system by discharge section C, made up of turns $C_1$, $C_2$, $C_3$, etc.

The number of turns shown in each of the sections A, B, and C is merely representative. In actual practice, the number of turns in the feed and discharge sections will depend on such factors as coil diameter and pressure conditions. The number of turns in the holding section will depend primarily on the time the material under treatment is desired to be retained under selected conditions of pressure and/or temperature.

Coil 6 is generally formed from tubing having a circular cross-section. However, this may be elliptical, rectangular, or of other configuration best suited to handling particular materials. Also, the coil may be jacketed or otherwise provided with means for heating or cooling the material which passes through it. Where it is desired to expose the material under treatment to radiant energy such as emitted by radiant heaters, microwave devices, ultraviolet lamps, or the like, the tubing may be in whole or in part made of material transparent to the selected form of radiation; for example, one may use boro-silicate glass tubing for heating of the material therein by infra-red radiation devices.

For introducing water and the material to be treated into coil 6 there is provided scoop 8 connected to turn $A_1$ by coupling 9. Each time coil 6 makes a revolution a slug of water and material having a total volume equal to one-half a turn of the coil is introduced into scoop 8, hence into coil 6. Water is delivered into scoop 8 via pipe 10 equipped with solenoid valve 11; material to be treated is delivered via chute 12 equipped with electrically-actuated gate 13. Valve 11 and gate 13 are operated by switch 14, mounted on a conventional support (not illustrated) so that it is independent of drum 1. When the rotation of the device brings scoop 8 to approximately the position shown in FIG. 3, switch 14 is triggered by cam 15 mounted on drum 1. Thereby valve 11 and gate 13 are opened. As rotation continues, cam 15 passes by switch 14 and delivery of water and material cease. It is, of course, obvious that the length of cam 15 is correlated with the characteristics of valve 11, gate 13, etc. so that a slug having a volume of ½ turn is introduced for each revolution of coil 6.

With rotation of coil 6 and feeding as above described, slugs of water and material are moved through successive turns $A_1$, $A_2$, $A_3$, etc. until they are delivered into section B. Moreover, section A acts as a pump in that a progressively increasing pressure is developed as the slugs are moved through turns $A_1$, $A_2$, $A_3$, etc. This result can be explained as follows: Each slug of water and material fed into section A has a volume of one-half that of a single turn of the coil. This limitation of the volume of the slugs combined with the facts that each slug is separated by an equal volume of air (air enters the coil as scoop 8 rotates away from its upward position) and that the system is working against the pressure existing in section B means that as the coil rotates these slugs cannot slump to the base of the coil; they form a series of hydrostatic columns and the total pressure developed is the sum of these columns. The way in which the heads build up in the individual turns is further explained below in connection with FIG. 6.

A feature of holding section B of coil 6 is that there are provided cross tubes 7. These permit free passage of air and water between opposite sides of the coil turns. Usually it is preferred that the material under treatment be kept out of tubes 7 since it may lodge therein. For this reason, screens 16 are preferably cemented at the ends of tubes 7 as shown in FIG. 4.

Figure 6:
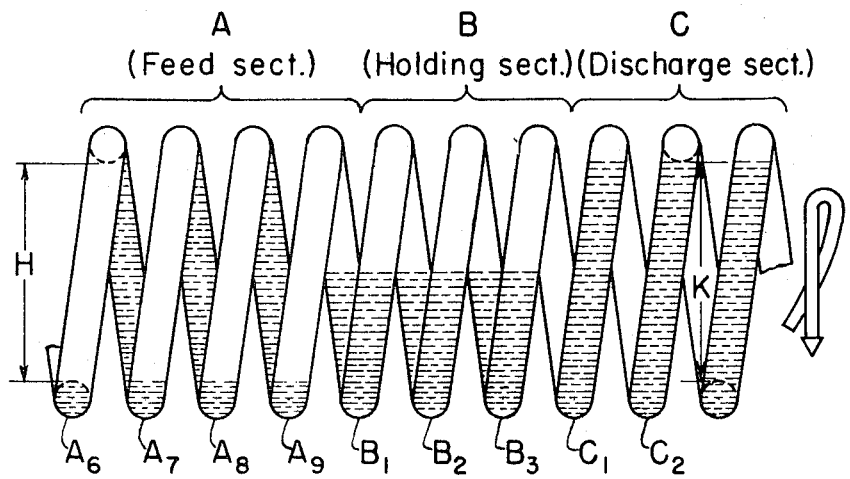
FIG. 6 is a diagram illustrating operation of the apparatus.

Cross tubes 7 exert what may be referred to as a short circuiting effect. They equalize the pressures in the various portions of turns $B_1$, $B_2$, and $B_3$ so that hydrostatic heads cannot be maintained; the slugs slump to the base of these turns as shown in FIG. 6. The net result is that the slugs are moved along (toward section C), yet they are maintained at constant pressure, i.e., there is no generation or loss of pressure. Moreover, the provision of cross tubes 7 establishes section B as the pressure center of the system, that is, the point along the length of coil 6 where the pressure is highest (or lowest, if the system is operated in a vacuum cycle).

For introduction of a desired fluid, such as air, steam, etc. into holding section B there is provided an axial pipe 17. At one end this pipe is in communication with the series of cross-tubes 7. At its other end pipe 17 is connected via rotary joint 18 with valve 19 and then to a source of the desired fluid. With this arrangement, a desired fluid may be introduced into holding section during operation of the system. Also, steam or air may be admitted into section B at the start of a run (preferably after all turns have received their quota of air and water) to bring the pressure up to the desired level. Indeed, this is the preferred way of starting up the system in order to establish a steady state in the shortest time. Once the system is in operation, the supply of fluid into section B is cut off; the pressure therein is maintained by the hydrostatic heads developed in coil 6.

Where holding section B is to be held under sub-atmospheric pressure, one may connect pipe 17 to a vacuum pump or the like to draw out air or other gases from this section.

During its passage through section B the material forming part of the slugs is exposed to a desired treatment. For example, where the material is to be blanched, cooked, pasteurized, or the like it may be exposed to steam introduced into section B via pipe 17. Alternatively, heat may be applied outside the turns which make up section B as by exposing this section to sprays of a hot heat-transfer medium, radiant energy, microwaves, or by providing steam- or electrically-heated jackets about the turns of this section. Since section B in essence acts as a pressure vessel, temperatures above 212° F. may be employed without boiling the water in the system. Also as noted above, the number of turns in this holding section may be increased any number desired to permit retention of the material for the time necessary to impart the desired physical and/ or chemical changes to the material.

After passage through holding section B, the slugs of water and material are moved into section C and transported by the latter out of the system. Section C functions similarly to section A except that in the present case the pressure in the individual turns $C_1$, $C_2$, $C_3$, etc. progressively decreases until the slugs are eventually discharged at atmospheric pressure out of the open end 6' of the coil. In effect, section C operates as a pressure lock which prevents loss of the pressure existing in holding section B and concomitantly discharges the treated material from the system. The de-pressurizing effect of section C is based on the fact that greater pressure is exerted on the downstream ends of the slugs than on the upstream ends. Thus the individual heads in turns $C_1$, $C_2$, $C_3$ form on the opposite side of coil 6 from those formed in turns $A_1$, $A_2$, and $A_3$, and, in essence, counter-balance the heads of section A. The position of the heads in the various sections is shown in FIG. 6.

A special feature of sections A and C of coil 6 is a series of air feed-back tubes D, individually designated as $D_1$, $D_2$, $D_3$, etc. These tubes provide for passage of air between complementary turns of sections A and C, i.e., those equidistantly spaced from the holding zone B. Thus the connections shown are $A_2$–$C_8$, $A_3$–$C_7$, $A_4$–$C_6$, $A_5$–$C_5$, $A_6$–$C_4$, $A_7$–$C_3$, $A_8$–$C_2$, and $A_9$–$C_1$. The end tubes $A_1$ and $C_9$ may be similarly interconnected. Although it is preferred in practice that at least a major proportion of the feed and discharge turns be thus interconnected, even one or two of the interconnections—particularly between turns near the holding section—will exert a improvement and such modifications are included in the broad ambit of the invention.

Tubes D are referred to as feedback tubes because they permit air to feed backward in the system, that is, from the turns of section C to complementary turns of section A. Thus, tubes D exert an equalizing effect; they permit the air which is expanding within section C (because of the de-compression taking place therein) to flow into section A. Thereby several useful results are attained. Since excess air is bled out of section C, there is no danger that water or material will be blown out of the discharge end of section C. Secondly, the air flowing through the feedback tubes into section A has the desirable result of counteracting the reduction of air volume which normally would take place in section A. To further explain this point, it must be realized that section A operates in a pressure-increasing cycle. Therefore, in the absence of our novel feedback tubes the portions of air between individual slugs will be compressed (decreased in volume) with the net result that individual hydrostatic heads are less than would be expected by the coil dimensions. When, however, air is fed back into section A the said portions of air are increased in volume whereby the hydrostatic heads assume their full capability—equivalent in height to the inside diameter of the coil—with the net result that substantially maximum pumping effect is attained by section A. Concomitantly the bleeding of excess air out of section C permits the individual hydrostatic heads in this section to assume their full capability so that in this instance also the substantially maximum pumping effect is achieved. A third advantage of the feedback tubes is that they tend to neutralize the effects of transients. Thus, for example, if there are minor variations in rate of water or material being fed into the system or if bubbles of air are entrapped in this entering water, there is no disturbance in the operation of the system.

It is to be observed that feedback tubes D have a much smaller diameter than the tubing of which coil 6 is formed. The small diameter of the feedback tubes coupled with the fact that the viscosity of water is about 50 times that of air means that the feedback tubes act as selective valves; they permit the passage of air but essentially prevent the passage of water. Typically, we have found that tubing with an I.D. of about 3/16 to 1/4 inch functions properly—allows passage of air and minimizes passage of water. In general, the feedback tubes should have an internal cross-sectional area about 1.5% to 2% that of the tubing of coil 6. It is, of course, desired that the material being treated not enter into feedback tubes D. Ordinarily, the small diameter of the tubes will prevent entry of the material. In the event, however, that one is treating a material in the form of small particles, screens may be provided at the points where the tubes connect with the individual turns of coil 6.

In the drawing, especially FIG. 1, feedback tubes D extend along the outer periphery of coil 6. This, however, is not a critical matter; the interconnections may be through the interior of drum 1. In any event, however, it is preferred that the connections of the feedback tubes to section A and to section C be displaced about 180°.

Reference is now made to FIG. 6 which is a diagram illustrating the situation which exists in coil 6 during operation. The hydrostatic heads form on the back side of section A, and, because of the feedback arrangement each individual head H in this section is the same and the maximum possible. The total head developed by section A is distance H times the number of turns in this section. It is to be noted that if the feedback system were not used the individual heads H would be progressively shorter from left to right because of the progressively greater compression (reduction of volume) of the portions of air between individual slugs. Thus, in such case the total head would be decreased by a substantial factor dependent on the total difference in pressure between the ends of section; in sum, the apparatus would not function to its full capability.

In section B, the pressure-equalizing cross tubes cause the slugs to slump to the base of the turns so that pressure remains essentially constant in this section.

In section C, the heads K form on the front side of this section, and because of the feedback system which routes expanding air backwards to section A, each individual head K in this section is the same and the maximum possible. The total head involved is K times the number of turns in this section of the coil.

FIG. 6 illustrates a unique advantage of our invention, one involving a saving in energy required to feed material through the system. The critical item here is that the heads form on opposite sides of the sections A and C. This means that they counterbalance one another. The situation may be likened to a cable car arrangement on a mountainside wherein two cars are so connected to the cable that the ascent of one is assisted by the descent of the other. This net result of this counterbalancing effect is that in our system the energy required to rotate drum 1 (and coil 6) is for the most part that required to overcome friction—friction in the bearings and friction involved in passage of air, water, and material through the coil.

As evident from FIG. 6, one can readily calculate the parameters of a pumping section which will provide (or resist) a given pressure. Since the maximum individual head which can be formed is equal to the coil diameter, and the individual heads act additively, the total head developed is equal to the coil diameter times the number of turns. (Coil diameter refers to this dimension of the coil as a unit, and is not to be confused with diameter of the tubing.)

It is significant to note that neither the speed of rotation of the coil nor the diameter of the tubing which makes up the coil play any role in pressure generation. These items, however, do affect the throughput of the system. Naturally, the larger the diameter of the tubing and the higher the speed of rotation the greater will be the throughput of the system. It is also obvious that the diameter of the tubing needs to be large enough for easy passage of the particular material which is under treatment.

In setting up the total apparatus, one uses a feed section and a discharge section, each of which provides the same pressure. For example, if holding section B is to operate a $x$ lbs. pressure, each of the sections A and C would be selected with such parameters as to be capable of providing (or resisting) a pressure of $x$ lbs.

The total head can, of course, be regarded in either a positive or negative sense. For example, if section B is operated at superatmospheric pressure, one may consider the head in section A as positive (pressure developing), and the head in section C as negative (pressure resisting). Where section B is operated at subatmospheric pressure, the situation would be reversed: the head in section A negative (pressure resisting), that is section C positive (pressure developing). In sum, the total head ($H_t$) can be calculated from the formula—

$$H_t = nD$$

where $n$ = number of turns
$D$ = coil diameter

In contrast, in situations where feedback tubes are not used the total head is reduced by a factor dependent on the compressibility of air. The distinction between the heads developed in our system and those in the system of application 729,626 (Patent No. 3,489,074) is demonstrated by FIG. 7. It is evident from the several curves that the feedback system provides a linear relationship between head and turns of the coil; whereas without feedback, the head drops off (due to compression of air) more and more as the number of turns is increased.

Hereinabove, water has been stressed as the liquid used in our system. It is to be emphasized, however, that one can use any liquid as the carrier. Typically, one may use glyceride oils; ethyl, isopropyl, or other alcohols; glycol; glycerine; silicone oils; chlorinated hydrocarbons; petroleum distillates or other hydrocarbon liquids; aqueous solutions of sugar, salt, sodium bisulphite, etc. For example, where our apparatus is used for the cooking or frying of potato pieces, diced chicken, or the like the carrier may be water, water containing dissolved salt, or it may be a glyceride oil or fat such as cottonseed oil, corn oil, lard, soybean oil, or the like. It is obvious that where the carrier comes into contact with the food it should be an edible substance. Where, however, the food is hermetically sealed in cans, jars, pouches of plastic or foil the carrier may be any liquid, edible or not. In fact, in treating packaged foods at elevated temperatures (as in pasteurizing, sterilizing, cooking, or blanching treatments) it may be desirable to use liquids having boiling points above that of water—such as glycol, glycerine, silicone oils, hydrocarbon oils, etc.—to avoid formation of vapors. For such applications as impregnation of fruit pieces the carrier is desirably water containing the agent or agents desired to be invested in the fruit tissue. Thus, in such case the carrier may be an aqueous solution containing one or more of such substances as sugar, fruit juice, fruit essences of flavorings, salt, ascorbic acid, sodium bisulphite, sulphur dioxide, vitamins, etc. Moreover, gases other than air may be introduced at the feed inlet to coil 6. Thus, for example, one may introduce ethylene gas for fruit-ripening procedures. Gases such as nitrogen, carbon dioxide, or mixtures thereof may be introduced for controlling oxidation or respiration of fruit or vegetables being treated.

The apparatus of the invention can be applied to all kinds of processes which involve a treatment of material at pressures above or below atmospheric. Typical of treatments under superatmospheric pressure are cooking or blanching of foods, pasteurizing or sterilizing of packaged foods, etc. Typical of treatments under subatmospheric pressure are: impregnation of fruit slices with sugar syrups or other liquids containing sweeteners, flavoring agents, preservatives, etc.; degassing of fruit slices or other foods prior to packaging; impregnation of beans, cereals, or other foods with solutions containing preservatives, tenderizing agents, etc. It is evident that where the treatment involves contacting of foods with syrups or other liquids as noted above, such liquid would be used as the carrier instead of plain water.

FIG. 8 illustrates how the system is modified when holding section B is to be operated at subatmospheric pressure. The end of pipe 17 is connected to vacuum pump 20 (or other conventional device such as an aspirator or steam ejector). In starting a run vacuum pump 20 is operated to reduce the pressure in section B to the desired level. Also, during the run the vacuum pump is operated as necessary to scavenge air (and any other gases which enter section B) and keep the vacuum at the selected level. In such vacuum operation, coils A and C are constructed and function the same as described in connection with the modification of FIG. 1. Also, in selecting the parameters of the coils, the same principles apply. For example, if section B is to be operated at one-half atmosphere, one would select the parameters of sections A and C so that each would have the capability of generating one-half atmosphere or, expressed in other terms, a head of 17 ft. of water. It is also evident that in operating in a vacuum system, coil A would operate to resist pressure whereas coil C would operate in a pressure-generating capacity.

FIG. 9 illustrates a modification of the invention which is provided with means for by-passing the carrier liquid around holding section B. This modification is employed when it is desired to treat a material in the absence of the carrier liquid. For example, in pasteurizing or sterilizing applications the material can be heated without concomitantly heating the carrier liquid. The apparatus of this modification is the same as previously described, with this exception: A series of bypass tubes 22 are provided which interconnect turn $A_9$ with turn $C_1$. As a result, the carrier liquid flows from turn $A_9$ directly to turn $C_1$ and so bypasses holding section B. The material under treatment is conveyed in its usual path—from turn $A_9$ through $B_1$, $B_2$, $B_3$, and then into turns $C_1$, $C_2$, $C_3$, etc. To prevent the material from entering bypass tubes 22, one may provide screens at the points where the tubes join with turns $A_9$ and $C_1$, similar to the screens used with cross tubes 7 described above. Since it is desired that there be an essentially unimpeded flow of carrier liquid from turn $A_9$ to turn $C_1$, tubes 22 should be adequate in diameter and number to carry the flow. Generally one uses about 4, 6, or 8 tubes of such size that their combined cross-sectional area is at least the same as, preferably twice, the cross-sectional area of the tubing which makes up coil 6. As evident from FIG. 9, tubes 22 have a pitch such that the points on turns $A_9$ and $C_1$ which are joined by an individual tube 22 are separated by 180°. The tubes need not be on the outside of coil 6; they may pass through the interior of drum 1. The modification of FIG. 9 can be employed for treating materials under super- or subatmospheric pressures by choice of the appropriate auxiliary equipment communicating with cross tubes 7 of holding section B.

Having thus described the invention, what is claimed is:
1. A method for conveying a material from a zone at atmospheric pressure to a zone at a different pressure and then back to the zone at atmospheric pressure, which comprises:
   (a) providing a coil of tubing wound in a multiplicity of turns about an axis,
   (b) rotating the coil about the axis,
   (c) feeding the material together with a carrier liquid in the form of discrete slugs alternately with equal volumes of air into one end of the coil,
   (d) each slug having a volume essentially equal to one-half the volume of a single turn of the coil,

(e) neutralizing pressure differentials at intermediate turns in the coil, and
(f) providing feedback of expanding air in the coil to stabilize the system and increase its efficiency.

2. A method for treating a food while conveying it from a zone at atmospheric pressure to a zone at a different pressure and then back to the zone at atmospheric pressure, which comprises:
(a) providing a coil of tubing wound in a multiplicity of turns about an axis,
(b) rotating the coil about the axis,
(c) feeding the food together with a carrier liquid in the form of discrete slugs alternately with equal volumes of air into one end of the coil,
(d) each slug having a volume essentially equal to one-half the volume of a single turn of the coil,
(e) neutralizing pressure differentials at intermediate turns in the coil, and
(f) providing feedback of expanding air in the coil to stabilize the system and increase its efficiency.

3. Apparatus for conveying material through a holding zone maintained at a pressure higher or lower than atmospheric, comprising in combination:
(a) a coil of tubing wound in a plurality of turns about an axis, and mounted for rotation about the axis,
(b) the coil being subdivided into a feed section at one end, and intermediate holding section, and a discharge section at the other end,
(c) cross tubes interconnecting the turns of the holding section for neutralizing pressure differentials within this section, and
(d) feedback tubes interconnecting turns of the feed and discharge sections, which are equidistantly spaced from the holding zone.

4. The apparatus of claim 3 wherein the feedback tubes have a lesser diameter than that of the tubing of the coil.

5. The apparatus of claim 3 wherein the feedback tubes have a cross-sectional area about 1 to 2% that of the tubing of the coil.

6. The apparatus of claim 3 which includes means for introducing into the feed section a material to be treated accompanied by a carrier liquid.

7. The apparatus of claim 3 which includes means for introducing into the feed section discrete slugs comprising a material to be treated and a carrier liquid.

8. The apparatus of claim 3 which includes means for introducing into the feed section, in alternation,
(i) slugs of material to be treated and a carrier liquid, and
(ii) essentially equal volumes of air.

9. The apparatus of claim 3 which includes means for introducing into the feed section discrete slugs of material to be treated and a carrier liquid, each slug having a volume essentially equal to one-half the volume of a single turn of the coil, the slugs being introduced at the rate of one per revolution of the coil.

10. The apparatus of claim 3 which includes heating means.

11. The apparatus of claim 3 which includes means for introducing a fluid into the holding section.

12. The apparatus of claim 3 which includes means for exhausting gases from the holding section.

13. The apparatus of claim 3 which includes means for bypassing carrier liquid around the holding section.

14. Apparatus for conveying material from a first zone open to atmospheric pressure into a second zone at a pressure different from atmospheric and then to a third zone open to atmospheric pressure, which comprises in combination:
(a) a coil of tubing wound in a plurality of turns about an axis, and mounted for rotation about the axis,
(b) the coil including in sequence a feed section, a holding section, and discharge section,
(c) the feed section communicating at one end with the first zone at atmospheric pressure and at the other with the holding section,
(d) the discharge section communicating at one end with the holding section and at the other with the third zone at atmospheric pressure,
(e) cross tubes interconnecting the turns of the holding section for neutralizing pressure differentials within this section,
(f) feedback tubes interconnecting turns of the feed and discharge sections, which are equidistantly spaced from the holding zone,
(g) the feedback tubes being of a diameter, relative to the diameter of the tubing of the coil, to permit passage of gases and impede passage of liquids, and
(h) means for introducing into the feed section a material together with a carrier liquid in the form of discrete slugs alternately with essentially equal volumes of air,
(i) each slug having a volume essentially equal to one-half the volume of a single turn of the coil.

References Cited

UNITED STATES PATENTS

| 1,114,603 | 10/1914 | Giger | 103—86 |
| 3,489,074 | 1/1970 | Farkas et al. | 99—249 |

FOREIGN PATENTS

| 442,863 | 4/1927 | Germany | 103—86 |

WALTER A. SCHEEL, Primary Examiner

A. I. CANTOR, Assistant Examiner

U.S. Cl. X.R.

99—102, 215, 237, 239, 249, 362, 404